(12) United States Patent
Taniguchi

(10) Patent No.: US 7,208,847 B2
(45) Date of Patent: Apr. 24, 2007

(54) VEHICULAR ELECTRIC POWER GENERATING SYSTEM

(75) Inventor: Makoto Taniguchi, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/124,054

(22) Filed: May 9, 2005

(65) Prior Publication Data

US 2005/0258651 A1 Nov. 24, 2005

(30) Foreign Application Priority Data

May 7, 2004 (JP) ............... 2004-137972

(51) Int. Cl.
*F02B 63/00* (2006.01)
(52) U.S. Cl. ............... 290/40 A; 290/40 B; 290/40 C; 290/40; 290/40 F
(58) Field of Classification Search ............ 290/40 R, 290/40 A, 40 B, 40 C, 40 F
See application file for complete search history.

(56) References Cited

U.S. PATENT DOCUMENTS

| | | | | |
|---|---|---|---|---|
| 5,880,533 A | * | 3/1999 | Arai et al. ............ | 290/31 |
| 6,186,255 B1 | * | 2/2001 | Shimasaki et al. ...... | 180/65.3 |
| 6,365,983 B1 | * | 4/2002 | Masberg et al. ........ | 290/40 C |
| 6,455,947 B1 | * | 9/2002 | Lilley et al. .......... | 290/40 C |
| 6,909,197 B2 | * | 6/2005 | Kaga et al. ........... | 290/40 C |

FOREIGN PATENT DOCUMENTS

| | | |
|---|---|---|
| JP | A 06-189600 | 7/1994 |
| JP | A 09-9413 | 1/1997 |
| JP | A 10-14295 | 1/1998 |
| JP | A 10-505890 | 6/1998 |
| JP | A 11-125328 | 5/1999 |
| JP | A 2000-116197 | 4/2000 |
| JP | A 2001-103796 | 4/2001 |
| JP | A 2003-264995 | 9/2003 |

\* cited by examiner

*Primary Examiner*—Darren Schuberg
*Assistant Examiner*—Iraj A. Mohandesi
(74) *Attorney, Agent, or Firm*—Oliff & Berridge PLC

(57) ABSTRACT

A vehicular electric power generating system includes a vehicular electric generator rotatable by an engine mounted on a vehicle, and a rotational speed changing device for transmitting rotational power generated by said engine to said vehicular electric generator to rotate said vehicular electric generator selectively in a relatively high first rotational speed range and a relatively low second rotational speed range. An ECU controls the speed ratio of the rotational speed changing device based on the running state of the vehicle and the charged state of a battery on the vehicle, to control the vehicular electric generator to rotate selectively in the first rotational speed range and the second rotational speed range.

7 Claims, 7 Drawing Sheets

VEHICULAR ELECTRIC POWER GENERATING SYSTEM

CROSS-REFERENCE TO RELATED APPLICATIONS

This application is based upon and claims the benefits of priority from the prior Japanese Patent Application No. 2004-137972, filed on May 7, 2004, the entire contents of which are incorporated herein by reference.

BACKGROUND OF THE INVENTION

1. Field of the Invention

The present invention relates to a vehicular electric power generating system having a vehicular electric generator rotatable by an engine mounted on a vehicle.

2. Description of the Related Art

Conventional vehicular electric generators are rotated at a certain speed increasing ratio by the vehicle-mounted engine while the vehicle powered thereby is traveling. Recent vehicle-mounted engines have a tendency to idle at lower idling speeds to meet demands for reduced exhaust emission and reduced fuel consumption. Since such lower idling speeds result in a reduction in the operating speed of vehicular electric generators, the ability of the vehicular electric generators to supply electric power to various electric loads on vehicles is also lowered. Nevertheless, modern vehicles demand more electric power as various devices and units mounted on the vehicles are more and more computerized. Accordingly, greater difficulty is being experienced in keeping the operating point of vehicular electric generators in an optimum range. One solution is to rotate a vehicular electric generator in combination with a device for transmitting the rotation of an engine at a variable speed ratio to the vehicular electric generator. For details, reference should be made to Japanese laid-open patent publication No. 2001-103796 (pages 3 and 4, FIGS. 1 through 10), Japanese laid-open patent publication No. H09-9413 (pages 3 through 6, FIGS. 1 through 4), Japanese laid-open patent publication No. H11-125318 (pages 3 through 7, FIGS. 1 through 6), and Japanese laid-open patent publication No. 2003-264995 (pages 2 through 4, FIGS. 1 through 4). The power generating efficiency of the vehicular electric generator can be increased when the rotation of the engine is transmitted at a variable speed ratio to the vehicular electric generator, using the techniques disclosed in the above publications.

According to the disclosed techniques, the vehicular electric generator is operated to bring the power generating efficiency closely to an optimum operating point to seek for increased power generating efficiency and reduced fuel consumption. However, vehicles carry an electric power storage device that operates based on an electrochemical reaction, i.e., a battery, for temporarily storing electric power generated by a vehicular electric generator and supplying the stored electric power to various electric loads on the vehicle. The way in which the vehicular electric generator is required to supply electric power cannot ignore the charged state of the battery.

For example, when the vehicle is under heavy electric load conditions and the battery is discharging its stored electric energy, it is necessary to increase the electric power generated by the vehicular electric generator and shift the operating point of the vehicular electric generator for charging the battery. According to the conventional techniques, however, since the vehicular electric generator is controlled to bring the power generating efficiency closely to an optimum operating point, the vehicular electric generator may not necessarily produce enough electric power to charge the battery. If the vehicular electric generator is to generate enough electric power when the power generating efficiency is close to an optimum operating point, then the vehicular electric generator itself needs to be larger in size against the recent demands for smaller-size devices and units on vehicles.

SUMMARY OF THE INVENTION

It is therefore an object of the present invention to provide a vehicular electric power generating system which is capable of controlling the generation of electric power in view of both the charged state of an electric power storage device mounted on a vehicle and the power generating efficiency of a vehicular electric generator on the vehicle.

To achieve the above object, there is provided in accordance with the present invention a vehicular electric power generating system comprising a vehicular electric generator rotatable by an engine mounted on a vehicle, and a rotational speed changing device for transmitting rotational power generated by the engine to the vehicular electric generator to rotate the vehicular electric generator selectively in a relatively high first rotational speed range and a relatively low second rotational speed range. Generally, the maximum efficiency of the vehicular electric generator is achieved when the vehicular electric generator rotates in a relatively low rotational speed range. However, the generated electric power output of the vehicular electric generator is not high at the maximum efficiency. When the vehicular electric generator rotates in a relatively high rotational speed range, the vehicular electric generator generates a sufficiently high electric power output though the efficiency is low because the iron loss and the impedance drop are not negligible. In a higher rotational speed range, however, since the generated electric power output is saturated, the vehicular electric generator should not be rotated at high speeds in view of windage loss, wind noise, and bearing durability. According to the present invention, the vehicular electric generator is operated selectively in the relatively high first rotational speed range and the relatively low second rotational speed range for selective emphasis on the power generating efficiency and the generated electric power output. Accordingly, the electric power generation by the vehicular electric generator can be controlled in view of both the charged state of an electric power storage device and the power generating efficiency. Particularly, the second rotational speed range should preferably be less than a speed level that is three times the rotational speed at which the vehicular electric generator starts to generate electric power, i.e., the rotational speed at which the voltage induced across the armature windings of the vehicular electric generator is in excess of the voltage across the electric power storage device, and the first rotational speed range should preferably be higher than that speed level. The maximum efficiency of the vehicular electric generator can thus achieved when the vehicular electric generator operates in the second rotational speed range, and the generated electric power output is sufficiently high when the vehicular electric generator operates in the first rotational speed range.

The vehicular electric generator is preferably rotated in the first rotational speed range by the rotational speed changing device when the vehicle is decelerated. In recent years, there have been available vehicles wherein the vehicular electric generator generates increased electric power upon deceleration to convert kinetic energy produced upon deceleration effectively into electric energy. By operating the vehicular electric generator in the first rotational speed range when the vehicle is decelerated, the vehicular electric generator is able to convert much kinetic energy into electric energy.

The vehicular electric generator is preferably rotated in the second rotational speed range by the rotational speed changing device when the vehicle is accelerated. The power generating efficiency of the vehicular electric generator can thus be increased when the vehicle is accelerated, thus minimizing fuel consumption by the engine for the vehicular electric generator to generate electric power upon acceleration.

Preferably, the further includes an electric power storage device chargeable with electric power by the vehicular electric generator, and a charge detecting device for detecting a charged quantity of the electric power storage device, wherein the vehicular electric generator is rotated in the first rotational speed range by the rotational speed changing device when the charged quantity detected by the charge detecting device is smaller than a predetermined value, and the vehicular electric generator is rotated in the second rotational speed range by the rotational speed changing device when the charged quantity detected by the charge detecting device is greater than the predetermined value with this arrangement, since the operating point of the vehicular electric generator is set depending on the charged state of the electric power storage device, the electric power storage device is prevented from being unnecessarily charged. The vehicle is allowed to travel with reduced fuel consumption, and the electric power storage device can have an increased service life.

The vehicular electric generator preferably has armature windings each having two series conductors per phase. The vehicular electric generator thus constructed is capable of producing an increased electric power output when operating in the first rotational speed range. Inasmuch as the electric resistance and inductance of the armature windings are drastically reduced, any generated power loss and electromotive force loss caused by the vehicular electric generator are reduced, resulting in a further increase in the power generating efficiency when the vehicular electric generator operates in the second rotational speed range.

Preferably, the vehicular electric generator is operable as an electric motor, and the rotational speed changing device transmits rotational power generated by the vehicular electric generator to the engine so that the vehicular electric generator rotates in a third rotational speed range higher than the first rotational speed range when the vehicular electric generator operates as the electric motor. With this arrangement, the relationship between the operating point of the vehicular electric generator as it operates as the electric motor, i.e., the shaft horsepower supplied therefrom to the engine, and the rotational speed of the vehicular electric generator is optimized, and an auxiliary starter for use with a vehicular electric generator at a fixed speed ratio, e.g., the electric generator disclosed in Japanese laid-open patent publication No. H08-126115, may be dispensed with.

Preferably, the vehicular electric generator is rotated in the third rotational speed range by the rotational speed changing device when the engine is started. Accordingly, the engine can reliably be started by the vehicular electric generator.

The rotational speed changing device preferably comprises a toroidal continuously variable transmission. As the toroidal continuously variable transmission is of a single-shaft structure, it is simpler in structure and smaller in size than a belt-type CVT having a dual-shaft structure.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

1st Embodiment

Figure 1:
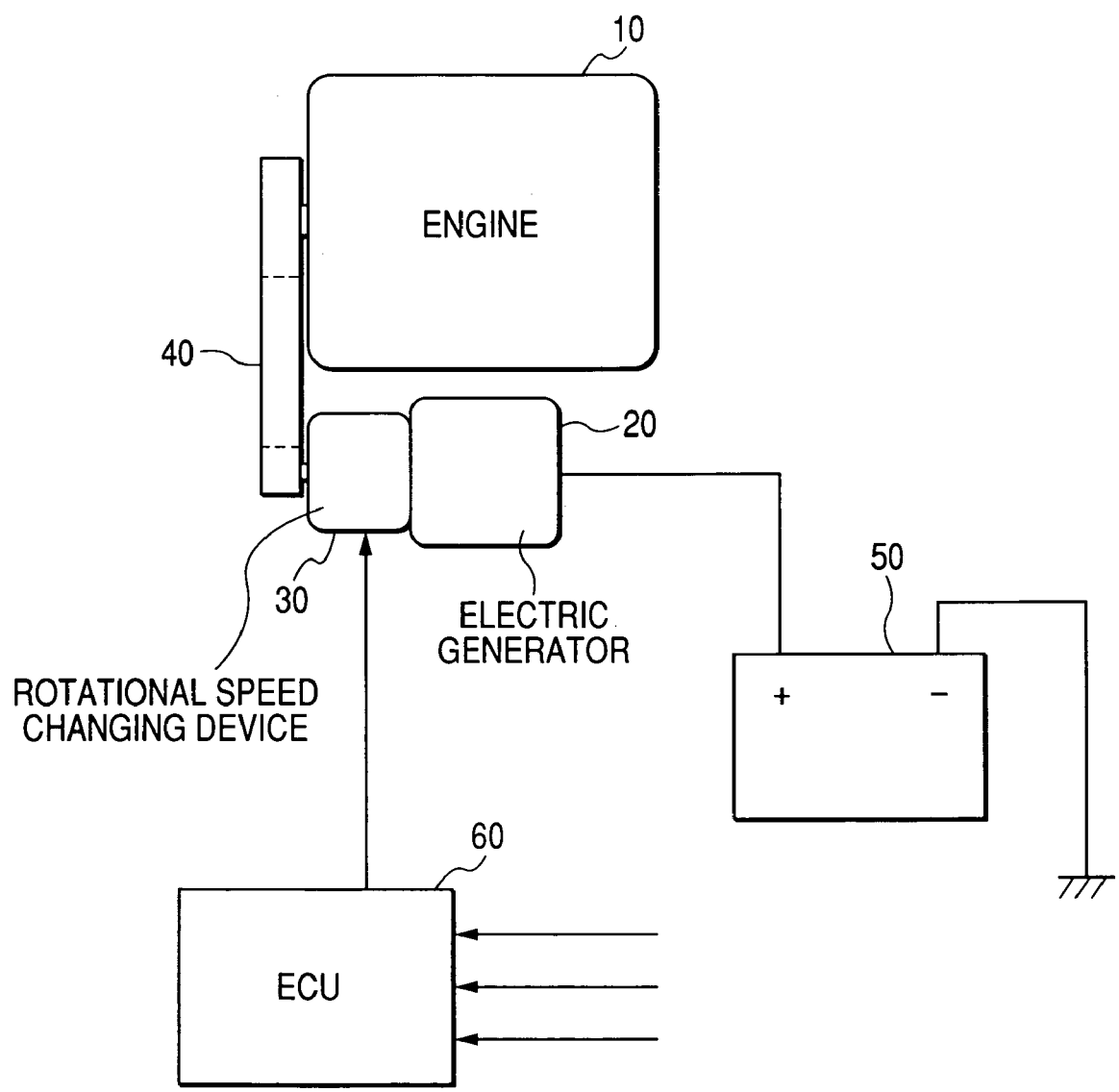
FIG. 1 is a block diagram of a vehicular electric power generating system according to a first embodiment of the present invention.

FIG. 1 shows in block form a vehicular electric power generating system according to a first embodiment of the present invention. As shown in FIG. 1, the vehicular electric power generating system, which is mounted on a vehicle such as an automobile, includes an internal combustion engine 10, a vehicular electric generator 20, a rotational speed changing device 30, a battery 50, and an ECU (engine controller) 60.

The vehicular electric generator 20 is rotated by the engine 10 to generate charging electric power to be supplied to the battery 50 as an electric power storage device on the vehicle and also to generate operating electric power to be supplied to various electric loads (not shown) on the vehicle. The rotational speed changing device 30 transmits rotational power generated by the engine 10 at a variable speed ratio to the vehicular electric generator 20. The rotational speed changing device 30 has a structure based on the principles of a toroidal CVT.

Figure 2:
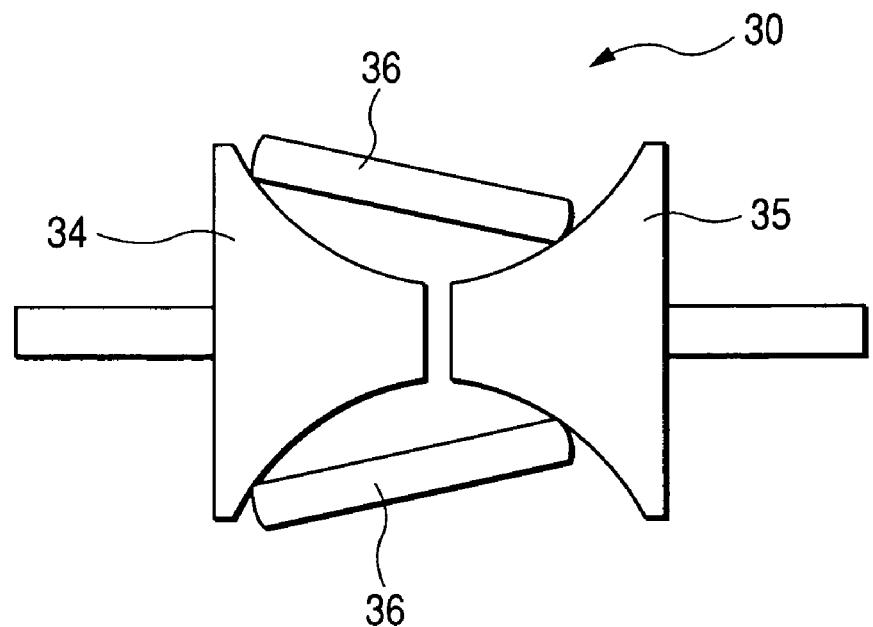
FIG. 2 is a schematic view showing a mode of operation of a rotational speed changing device based on the principles of a toroidal CVT (Continuously Variable Transmission)
Figure 3:
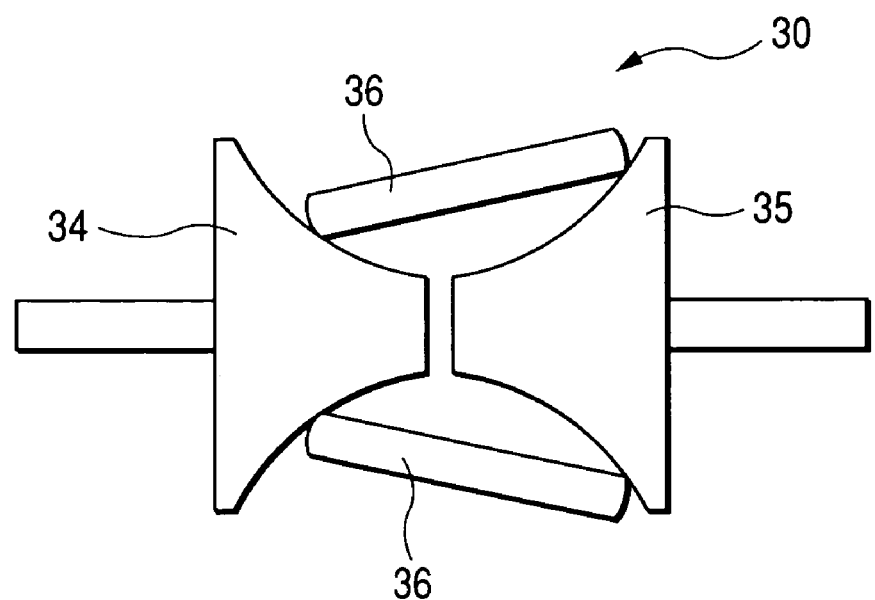
FIG. 3 is a schematic view showing another mode of operation of the rotational speed changing device based on the principles of the toroidal CVT.

FIGS. 2 and 3 schematically show structural details of the rotational speed changing device 30 in respective different modes of operation thereof. As shown in FIGS. 2 and 3, the rotational speed changing device 30 has an input disk 34, an output disk 35, and a pair of power rollers 36. The input disk 34 is essentially in the shape of a truncated cone and is operatively coupled to the engine 10 by an endless belt 40 (see FIG. 1). Similarly, the output disk 35 is also essentially in the shape of a truncated cone and is operatively coupled to the rotational shaft of the vehicular electric generator 20 either directly or through a coupling mechanism such as a belt or the like. The input disk 34 and the output disk 35 are axially aligned with each other and have respective contact surfaces axially confronting each other. The power rollers 36 are disposed between and held against the contact surfaces of the input and output disks 34, 35. The power rollers 36 are tiltable between the contact surfaces of the input and output disks 34, 35. When the power rollers 36 are held between a larger-diameter portion of the contact surface of the input disk 34 and a smaller-diameter portion of the contact surface of the output disk 35, as shown in FIG. 2, the rotational power is transmitted from the input disk 34 to the output disk 35 at such a speed increasing ratio that the rotational speed of the output disk 35 is higher than the rotational speed of the input disk 34. Conversely, when the power rollers 36 are held between a smaller-diameter portion of the contact surface of the input disk 34 and a larger-diameter portion of the contact surface of the output disk 35, as shown in FIG. 3, the rotational power is transmitted from the input disk 34 to the output disk 35 at such a speed reducing ratio that the rotational speed of the output disk 35 is lower than the rotational speed of the input disk 34. By thus changing the angle of tilt of the power rollers 36 between the contact surfaces of the input and output disks 34, 35, the speed ratio of the rotational speed changing device 30, i.e., the ratio between the rotational speeds of the input disk 34 and the output disk 35, can be set to a desired value within a predetermined range.

The ECU 60 controls the operating state of the engine 10 based on the accelerator operation, i.e., the throttle valve opening, of the vehicle, and also sets the speed ratio of the rotational speed changing device 30 to a desired value. The ECU 60 sets the speed ratio of the rotational speed changing device 30 in view of the running state of the vehicle and the charged state of the battery 50. The ECU 60 also operates as a charge detecting device for detecting a charged quantity of the battery 50.

Figure 4:
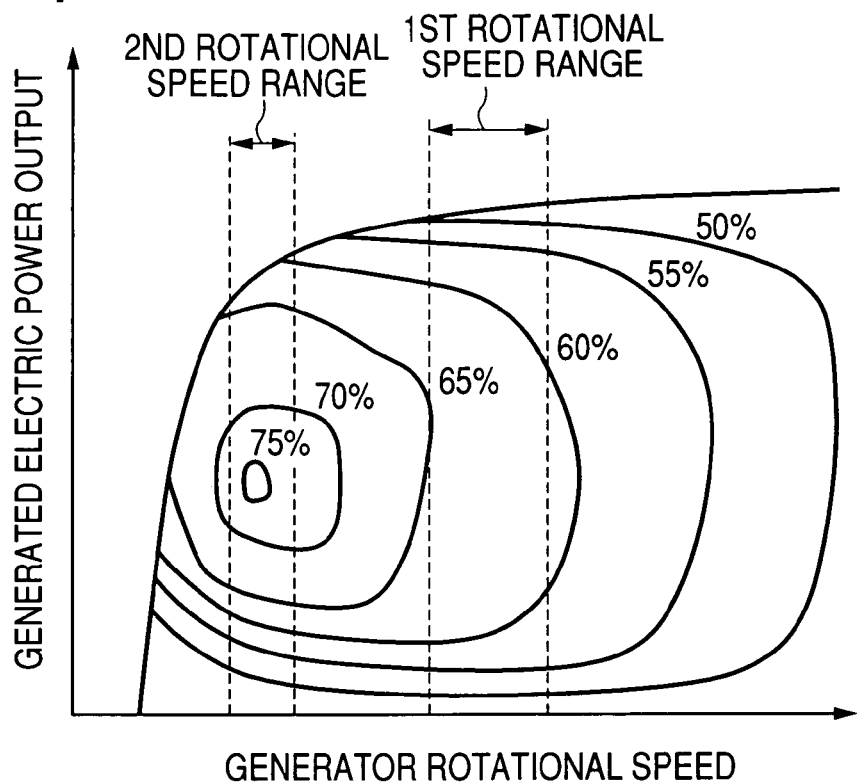
FIG. 4 is a diagram showing an efficiency map of a vehicular electric generator.

Operation of the vehicular electric power generating system will be described below. FIG. 4 shows an efficiency map of the vehicular electric generator 20. In FIG. 4, the horizontal axis represents the rotational speed of the vehicular electric generator 20, and the vertical axis the generated electric power output of the vehicular electric generator 20. The efficiency map includes areas indicated by 75%, 70%, 65%, 60%, 55%, and 50%, and these areas represent operating states in which the vehicular electric generator 20 generates electric power at power generating efficiencies indicated by those percentages.

As shown in FIG. 4, a high rotational speed range in which the generated electric power output of the vehicular electric generator 20 is relatively saturated is set as a first rotational speed range, and a low rotational speed range in which the power generating efficiency of the vehicular electric generator 20 is relatively high as set as a second rotational speed range. According to the first embodiment, the rotational speed changing device 30 transmits the rotational power from the engine 10 to the vehicular electric generator 20 at a selected speed ratio to control the vehicular electric generator 20 to generate electric power in either the first rotational speed range or the second rotational speed range. Preferably, the first rotational speed range is higher than a speed level that is three times the rotational speed at which the vehicular electric generator 20 starts to generate electric power, and the second rotational speed range is lower than such a speed level. Therefore, the second rotational speed range includes a rotational speed at which the power generating efficiency of the vehicular electric generator 20 is the highest, and the first rotational speed range includes a rotational speed at which the generated electric power output of the vehicular electric generator 20 is substantially saturated.

Figure 5:
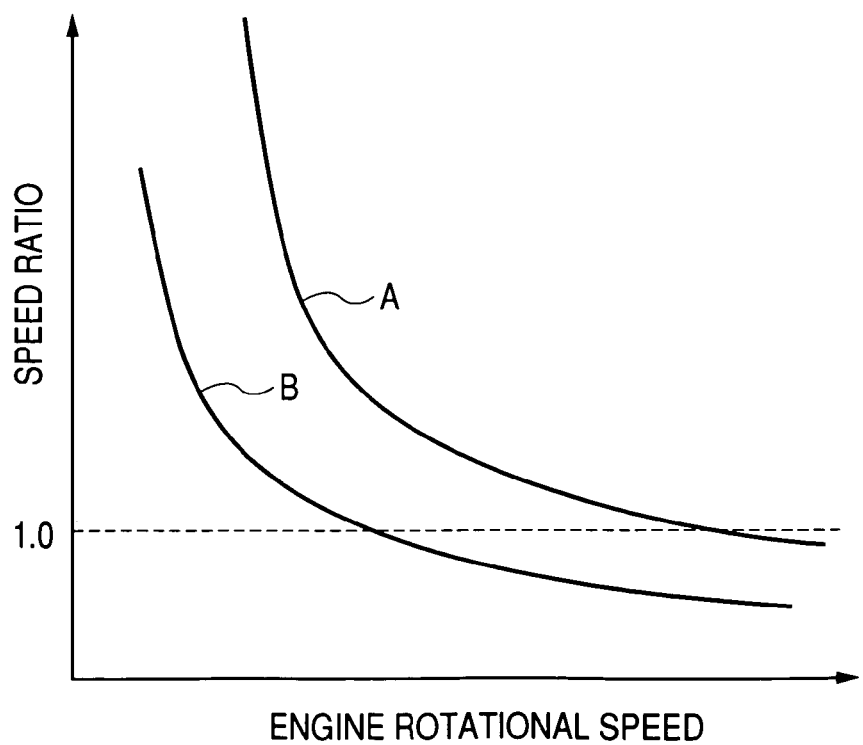
FIG. 5 is a diagram showing speed ratio profiles for controlling the rotational speed of the vehicular electric generator to fall selectively in a first rotational speed range and a second rotational speed range.

FIG. 5 shows speed ratio profiles for controlling the rotational speed of the vehicular electric generator 20 to fall selectively in the first rotational speed range and the second rotational speed range. In FIG. 5, the horizontal axis represents the rotational speed of the engine 10, and the vertical axis the speed ratio of the vehicular electric generator 20. For controlling the rotational speed of the vehicular electric generator 20 to fall essentially constantly in the first rotational speed range shown in FIG. 4, it is necessary to lower the speed ratio of the vehicular electric generator 20 when the rotational speed of the engine 10 increases, and to increase the speed ratio of the vehicular electric generator 20 when the rotational speed of the engine 10 decreases. This relationship between the speed ratio of the vehicular electric generator 20 and the rotational speed of the engine 10 is illustrated as a profile A in FIG. 5. The relationship basically applies to the second rotational speed range shown in FIG. 4. However, since the second rotational speed range is lower than the first rotational speed range, the speed ratio of the vehicular electric generator 20 needs to be lower for the same rotational speeds of the engine 10. This relationship for the second rotational speed range is illustrated as a profile B in FIG. 5.

Figure 6:
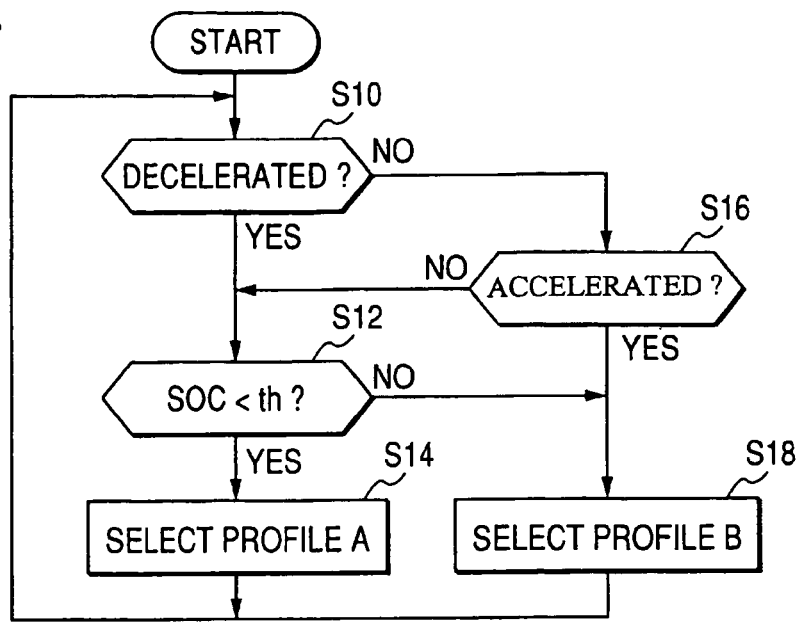
FIG. 6 is a flowchart of an operation sequence of an ECU (Electronic Control Unit) of the vehicular electric power generating system for controlling the vehicular electric generator to operate selectively in the first rotational speed range and the second rotational speed range depending on the running state of the vehicle.

FIG. 6 shows an operation sequence of the ECU 60 for controlling the vehicular electric generator 20 to operate selectively in the first rotational speed range and the second rotational speed range depending on the running state of the vehicle. First, the ECU 60 determines whether the vehicle is decelerated or not in step S10. According to the present embodiment, the vehicle is judged as being decelerated when the deceleration of the vehicle is equal to or higher than a predetermined value and the throttle valve opening is equal to or smaller than a predetermined value. If the vehicle is decelerated (YES in step S10), then the ECU 60 determines whether the charged quantity SOC of the battery 50 is smaller than a predetermined threshold value th or not in step S12. The threshold value th serves to detect when the battery 50 is not sufficiently charged and needs to be charged quickly. The charged quantity SOC of the battery 50 may be detected by any of various conventional processes, such as the process disclosed in Japanese laid-open patent publication No. H05-316666, for example.

If the charged quantity SOC is less than the threshold value th (YES in step S12), then the ECU 60 selects the profile A shown in FIG. 5 to set a speed ratio of the rotational speed changing device 30 depending on the rotational speed of the engine 10 in step S14. The vehicular electric generator 20 now operates in the first rotational speed range for more emphasis on the generated electric power output than on the power generating efficiency, quickly charging the battery 50 that has not sufficiently been charged. If the charged quantity SOC is not less than the threshold value th (NO in step S12), then the ECU 60 selects the profile B shown in FIG. 5 to set a speed ratio of the rotational speed changing device 30 depending on the rotational speed of the engine 10 in step S18. The vehicular electric generator 20 now operates in the second rotational speed range for more emphasis on the power generating efficiency than on the generated electric power output, generating electric power efficiently.

If the vehicle is not decelerated (NO in step S10), then the ECU 60 determines whether the vehicle is accelerated or not in step S16. According to the present embodiment, the vehicle is judged as being accelerated when the acceleration of the vehicle is equal to or higher than a predetermined value and the throttle valve opening is equal to or larger than a predetermined value. If the vehicle is accelerated (YES in step S16), then the ECU 60 selects the profile B shown in FIG. 5 to set a speed ratio of the rotational speed changing device 30 depending on the rotational speed of the engine 10 in step S18.

If the vehicle is not accelerated (NO in step S16), i.e., if the vehicle is neither decelerated nor accelerated, then the ECU 60 determines whether the charged quantity SOC of the battery 50 is smaller than the threshold value th or not in step S12. If the charged quantity SOC is less than the threshold value th, indicating that the battery 50 is not sufficiently charged, then the ECU 60 selects the profile A to operate the vehicular electric generator 20 in the first rotational speed range in step S14. Conversely, if the charged quantity SOC is not less than the threshold value th, indicating that the battery 50 is sufficiently charged, then the ECU 60 selects the profile B to operate the vehicular electric generator 20 in the second rotational speed range in step S18.

After the profile A or the profile B is selected based on the running state of the vehicle and the charged state of the battery 50 to set a speed ratio of the rotational speed changing device 30, and the vehicular electric generator 20 operates to generate electric power at the set speed ratio, control goes back to step S10 to repeat the operation sequence shown in FIG. 6.

By thus controlling the vehicular electric generator 20 to operate in the first rotational speed range or the second rotational speed range, the battery 50 can sufficiently be charged, and the upper limit for the rotational speed of the vehicular electric generator 20 can be made lower than heretofore. Consequently, the vehicular electric generator 20 is more durable in rotation, and wind noise caused by the cooling fan combined with the vehicular electric generator 20 is reduced. In addition, the vehicular electric generator 20 can effectively convert kinetic energy produced when the vehicle is decelerated into electric energy for reduced exhaust emission and reduced fuel consumption.

2nd Embodiment

Generally, if the number of series conductors of the armature windings of the vehicular electric generator 20, i.e., the number of turns of the armature windings, is reduced, the electromotive force induced across the armature windings is lowered, and hence the rotational speed of the vehicular electric generator 20 for starting to generate electric power is increased. For example, the rotational speed of the vehicular electric generator 20 for starting to generate electric power when the number of turns is 2 is about twice higher than when the number of turns is 4. With the reduced number of turns, since the impedance (DC resistance and inductance) of the armature windings is reduced, the impedance drop and loss caused by the armature windings are lowered, and the vehicular electric generator 20 produces an increased output current at high rotational speeds. Provided the armature core has constant slot areas, because the resistance and inductance of the armature windings are proportional to the square of the number of turns, if the number of turns is changed from 4 to 2, the resistance and inductance of the armature windings are reduced to ¼, making it possible for the vehicular electric generator 20 to generate a highly increased electric power output.

Figure 7:
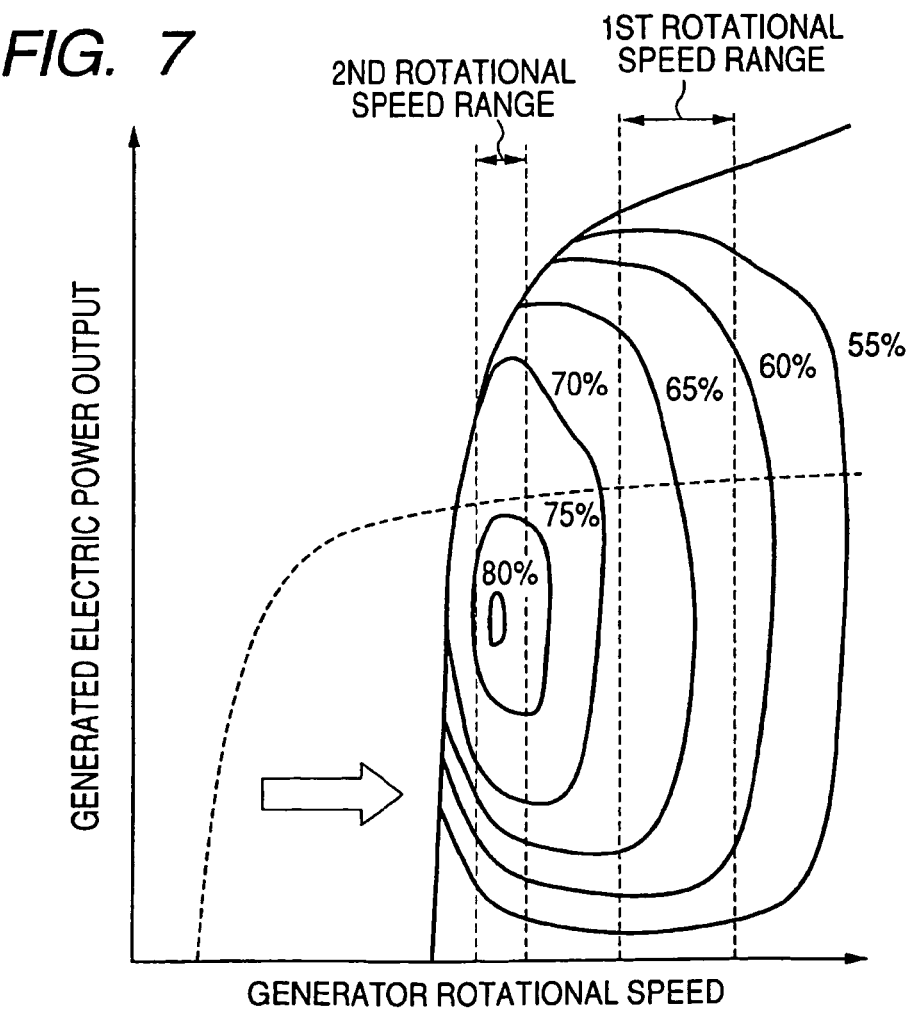
FIG. 7 is a diagram showing an efficiency map of a vehicular electric generator of a vehicular electric power generating system according to a second embodiment of the present invention, wherein the number of series conductors per phase of armature windings of the vehicular electric generator is reduced.

FIG. 7 shows an efficiency map of the vehicular electric generator 20 wherein the number of series conductors per phase of armature windings of the vehicular electric generator 20 is reduced. Specifically, in FIG. 7, the efficiency map and output characteristic curve of the vehicular electric generator 20 are plotted when the number of series conductors per phase of armature windings of the vehicular electric generator 20 is 2. In FIG. 4, the efficiency map and output characteristic curve of the vehicular electric generator 20 are plotted when the number of series conductors per phase of armature windings of the vehicular electric generator 20 is 4. The output characteristic curve of the vehicular electric generator 20 shown in FIG. 4 is indicated as the dotted line curve in FIG. 7.

Figure 8:
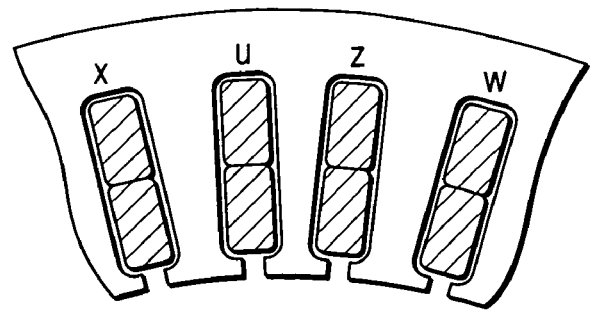
FIG. 8 is a fragmentary cross-sectional view of an armature wherein each phase has two series conductors.
Figure 9:
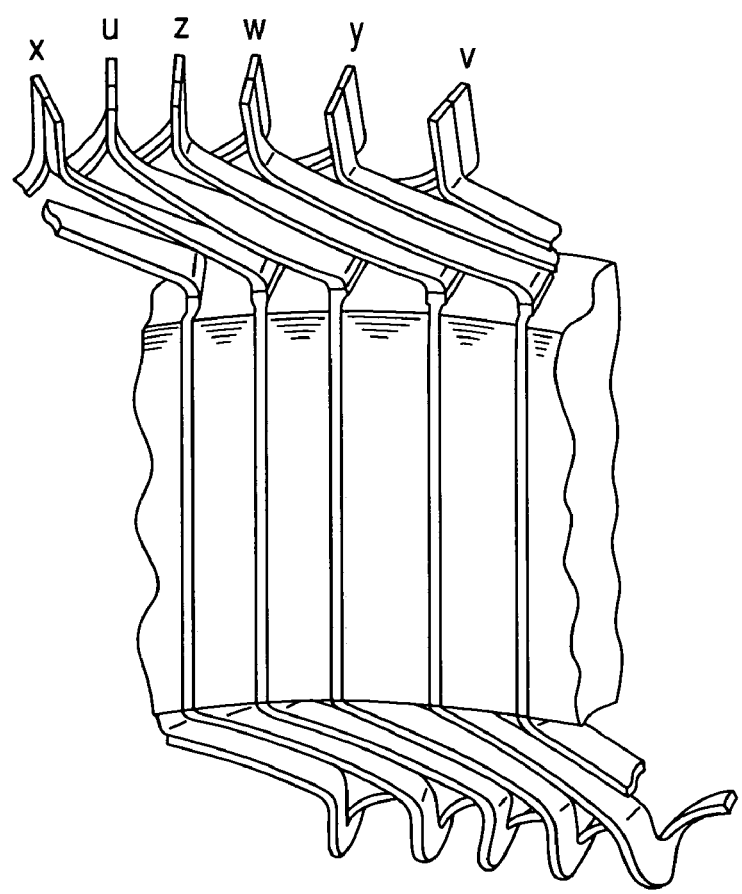
FIG. 9 is a fragmentary perspective view of the armature shown in FIG. 8.
Figure 10:
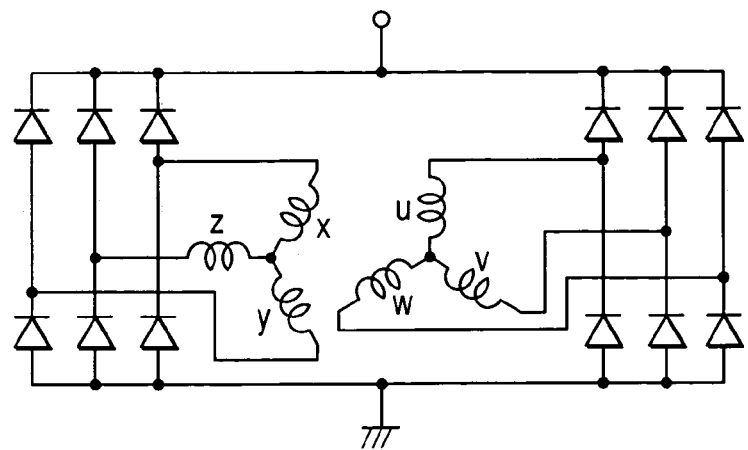
FIG. 10 is a circuit diagram of the vehicular electric generator incorporating the armature shown in FIG. 8, according to the second embodiment.

FIG. 8 shows in fragmentary cross section an armature wherein each phase has two series conductors. FIG. 9 shows the armature shown in FIG. 8 in fragmentary perspective. FIG. 10 shows a circuit of the vehicular electric generator incorporating the armature shown in FIG. 8, according to the second embodiment.

According to the second embodiment, the vehicular electric generator has an armature including two armature windings that are electrically 30° out of phase with each other. One of the armature windings comprises three phases, i.e., x, y, and z phases, and the number of series conductors of this armature winding in each phase is 2. Similarly, the other armature winding comprises three phases, i.e., u, v, and w phases, and the number of series conductors of this armature winding in each phase is also 2. The armature windings are connected respectively to full-wave rectifying circuits for rectifying voltages induced respectively across the armature windings and outputting the rectified voltages.

According to the second embodiment, as described above, the number of series conductors per phase of the armature windings of the vehicular electric generator is reduced. In addition, as with the first embodiment, the vehicular electric generator is controlled to operate selectively in the first rotational speed range for more emphasis on the generated electric power output than the power generating efficiency and the second rotational speed range for more emphasis on the power generating efficiency than on the generated electric power output. Therefore, the electric power regenerated by the vehicular electric generator when the vehicle is decelerated is increased, and the vehicular electric generator is reduced in size.

3rd Embodiment

In the first and second embodiments, the vehicular electric generator 20 simply operates to generate electric power. However, the armature windings of the vehicular electric generator 20 may be supplied with three-phase alternating currents at predetermined timings to generate a revolving magnetic field to rotator the rotor of the vehicular electric generator 20, thereby operating the vehicular electric generator 20 as an electric motor.

Figure 11:
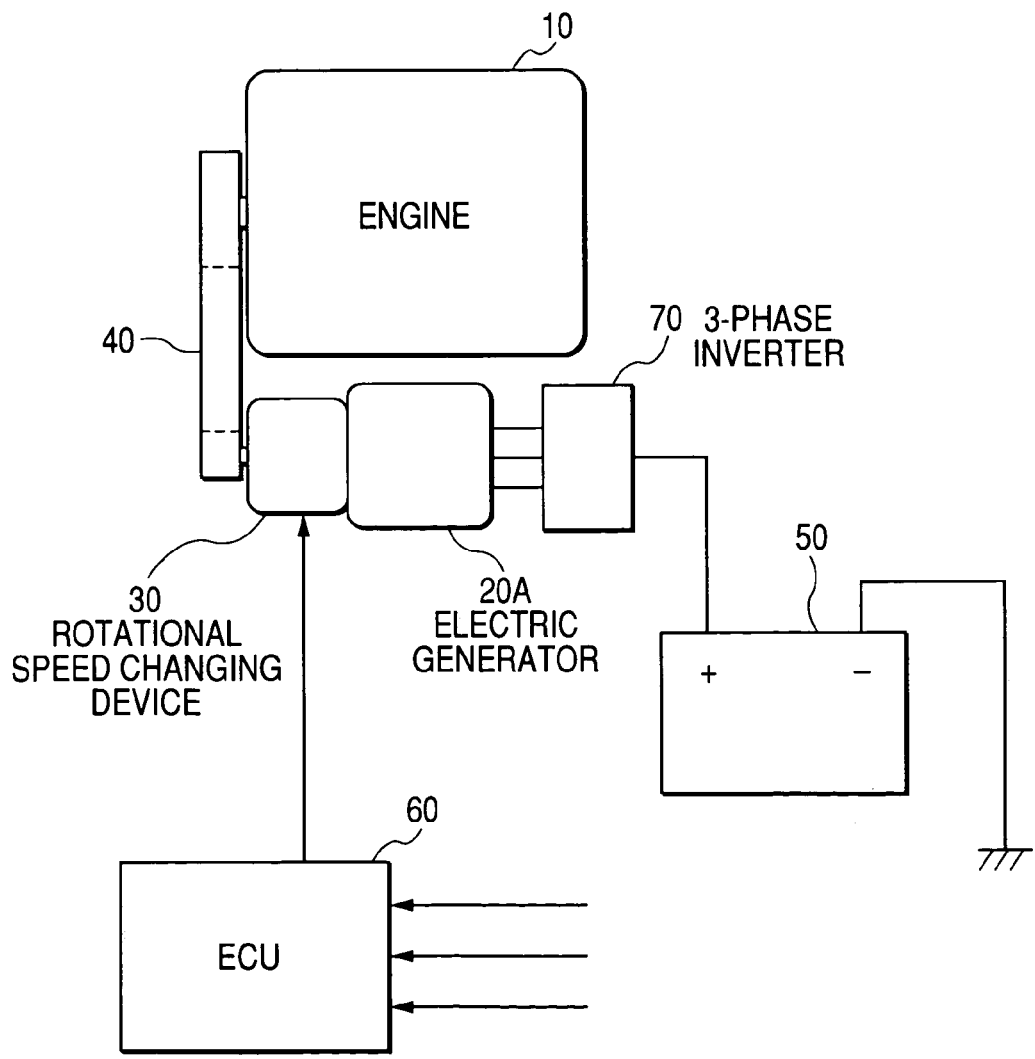
FIG. 11 is a block diagram of a vehicular electric power generating system according to a third embodiment of the present invention.

FIG. 11 shows in block form a vehicular electric power generating system according to a third embodiment of the present invention. The vehicular electric power generating system shown in FIG. 11 differs from the vehicular electric power generating system shown in FIG. 1 in that the vehicular electric generator 20 is replaced with a vehicular electric generator 20A and a three-phase inverter (INV) 70 is connected between the vehicular electric generator 20A and the battery 50. Other details of the vehicular electric power generating system shown in FIG. 11 are identical to those of the vehicular electric power generating system shown in FIG. 1. The vehicular electric generator 20A is of a structure similar to the vehicular electric generator 20, which has only an electric power generating function, except that the vehicular electric generator 20A is free of a rectifying circuit. The three-phase inverter 70 is connected in place of such a rectifying circuit. The three-phase inverter 70 includes six power MOSFETs connected as a three-phase bridge. The power MOSFETs are controlled to be selectively turned on and off to convert a DC voltage applied from the battery 50 into three-phase alternating currents at a predetermined frequency, which are supplied to the armature windings of the vehicular electric generator 20A. The vehicular electric generator 20A now operates as an electric motor. The power MOSFETs may also be controlled to be selectively turned on and off to rectify three-phase voltages generated by the vehicular electric generator 20A. The three-phase inverter 70 may be incorporated in the vehicular electric generator 20A.

Figure 12:
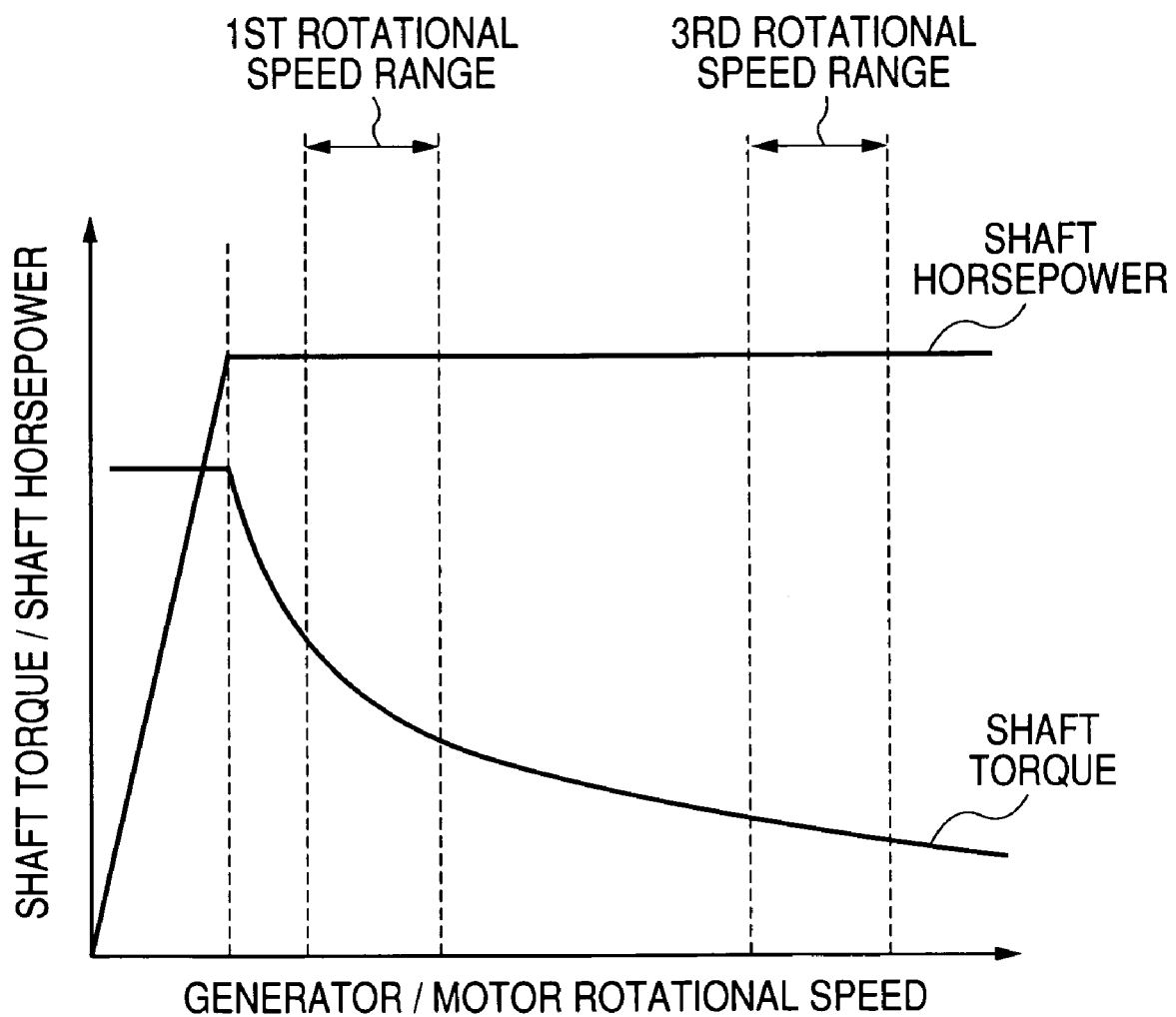
FIG. 12 is a diagram of shaft horsepower characteristics of a vehicular electric generator which doubles as an electric motor.

FIG. 12 shows shaft horsepower characteristics of the vehicular electric generator 20A which doubles as an electric motor. As shown in FIG. 12, the shaft torque output of the vehicular electric generator 20A at the time it operates as an electric motor is lowered as the rotational speed thereof increases. Since the shaft horsepower of the vehicular electric generator 20A can be expressed as (the shaft torque)× (the rotational speed), the shaft horsepower is essentially constant when the rotational speed is higher than a certain value.

It is assumed that the vehicular electric generator 20A as an electric motor operates in a third rotational speed range that is higher than the first rotational speed range. If the shaft horsepower is represented by P3, the rotational speed by N3, and the shaft torque by T3, they satisfy the following equation:

$$P3=(2\pi/60)\times N3\times T3$$

The shaft horsepower P3 is applied to the generator-side disk, i.e., the output disk 35 shown in FIGS. 2 and 3, of the rotational speed changing device 30. If the speed ratio of the rotational speed changing device 30 is represented by k3, then the rotational speed of the input disk 34 coupled to the engine 1 is represented by N3/k3, and the shaft torque by T3×k3.

By thus operating the vehicular electric generator 20A as an electric motor in the third rotational speed range, the vehicular electric power generating system according to the third embodiment lends itself to applications wherein the engine is required to rotate at a low rotational speed and to produce a high torque when it is started, particularly in a cold climate. Since the vehicular electric generator 20A may be used as an engine starter, any existing dedicated engine starter may be dispensed with, and hence the engine 1 as a whole may be simplified in structure.

Although certain preferred embodiments of the present invention have been shown and described in detail, it should be understood that various changes and modifications may be made therein without departing from the scope of the appended claims.

What is claimed is:

1. A vehicular electric power generating system comprising:
   a vehicular electric generator rotatable by an engine mounted on a vehicle;
   a rotational speed changing device for transmitting rotational power generated by said engine to said vehicular electric generator to rotate said vehicular electric generator selectively in a relatively high first rotational speed range and a relatively low second rotational speed range;
   an electric power storage device chargeable with electric power by said vehicular electric generator; and
   a charge detecting device for detecting a charged quantity of said electric power storage device;
   wherein said vehicular electric generator is rotated in said first rotational speed range by said rotational speed changing device when said charged quantity detected by said charge detecting device is smaller than a predetermined value, and said vehicular electric generator is rotated in said second rotational speed range by said rotational speed changing device when said charged quantity detected by said charge detecting device is greater than said predetermined value.

2. The vehicular electric power generating system according to claim 1, wherein said first rotational speed range is higher than a speed level that is three times the rotational speed at which the vehicular electric generator starts to generate electric power.

3. The vehicular electric power generating system according to claim 1, wherein said second rotational speed range is lower than a speed level that is three times the rotational speed at which the vehicular electric generator starts to generate electric power.

4. The vehicular electric power generating system according to claim 1, wherein said vehicular electric generator has armature windings each having two series conductors per phase.

5. The vehicular electric power generating system according to claim 1, wherein said vehicular electric generator is operable as an electric motor, and said rotational speed changing device transmits rotational power generated by said vehicular electric generator to said engine so that said vehicular electric generator rotates in a third rotational speed range higher than said first rotational speed range when said vehicular electric generator operates as the electric motor.

6. The vehicular electric power generating system according to claim 5, wherein said vehicular electric generator is rotated in said third rotational speed range by said rotational speed changing device when said engine is started.

7. The vehicular electric power generating system according to claim 1, wherein said rotational speed changing device comprises a toroidal continuously variable transmission.

* * * * *